(12) United States Patent
Asati et al.

(10) Patent No.: US 7,969,981 B2
(45) Date of Patent: Jun. 28, 2011

(54) SYSTEM AND METHOD FOR MULTICASTING IN AN INTERNET PROTOCOL VIRTUAL PRIVATE NETWORK ENVIRONMENT

(75) Inventors: Rajiv Asati, Morrisville, NC (US); Yiqun Cai, Cupertino, CA (US); Mohamed Khalid, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 12/202,454

(22) Filed: Sep. 2, 2008

(65) Prior Publication Data

US 2010/0054245 A1 Mar. 4, 2010

(51) Int. Cl.
*H04L 12/28* (2006.01)

(52) U.S. Cl. ........................................................ 370/390

(58) Field of Classification Search .................. None
See application file for complete search history.

(56) References Cited

U.S. PATENT DOCUMENTS

| | | | |
|---|---|---|---|
| 6,640,251 B1 | 10/2003 | Wiget et al. | |
| 7,136,374 B1 | 11/2006 | Kompella | |
| 7,260,097 B2 | 8/2007 | Casey | |
| 7,281,058 B1 | 10/2007 | Shepherd et al. | |
| 7,283,465 B2 | 10/2007 | Zelig et al. | |
| 7,292,542 B2 | 11/2007 | Wright | |
| 7,339,925 B2 | 3/2008 | O'Neill et al. | |
| 7,366,894 B1 | 4/2008 | Kalimuthu et al. | |
| 7,386,010 B2 | 6/2008 | Solomon et al. | |
| 7,408,882 B2 | 8/2008 | Abdo et al. | |
| 2003/0223372 A1* | 12/2003 | Sanchez et al. | 370/237 |
| 2005/0083955 A1* | 4/2005 | Guichard et al. | 370/409 |
| 2007/0153790 A1* | 7/2007 | Boers et al. | 370/390 |
| 2008/0080501 A1* | 4/2008 | Damm | 370/390 |
| 2009/0304003 A1* | 12/2009 | Huynh Van et al. | 370/395.31 |

* cited by examiner

*Primary Examiner* — Chirag G Shah
*Assistant Examiner* — Otis L Thompson, Jr.
(74) *Attorney, Agent, or Firm* — Patent Capital Group

(57) ABSTRACT

A method is provided in one example implementation and includes sending a PIM join message to the second spoke router by the hub router. The second spoke router dynamically determines each interested remote spoke router by parsing a hub-sent PIM message and accordingly constructs the multicast routing entry such that the first and second spoke routers establish multicast communication independent of a hub router. In more specific embodiments, the PIM join/prune messaging includes a list of each downstream spoke router that sent a PIM join/prune, in a new attribute. The PIM join/prune message is sent by the hub router towards a multicast source. A new receiver-list attribute is created that the hub router populates with a non-broadcast multi-access (NBMA) address for each interested spoke router.

16 Claims, 3 Drawing Sheets

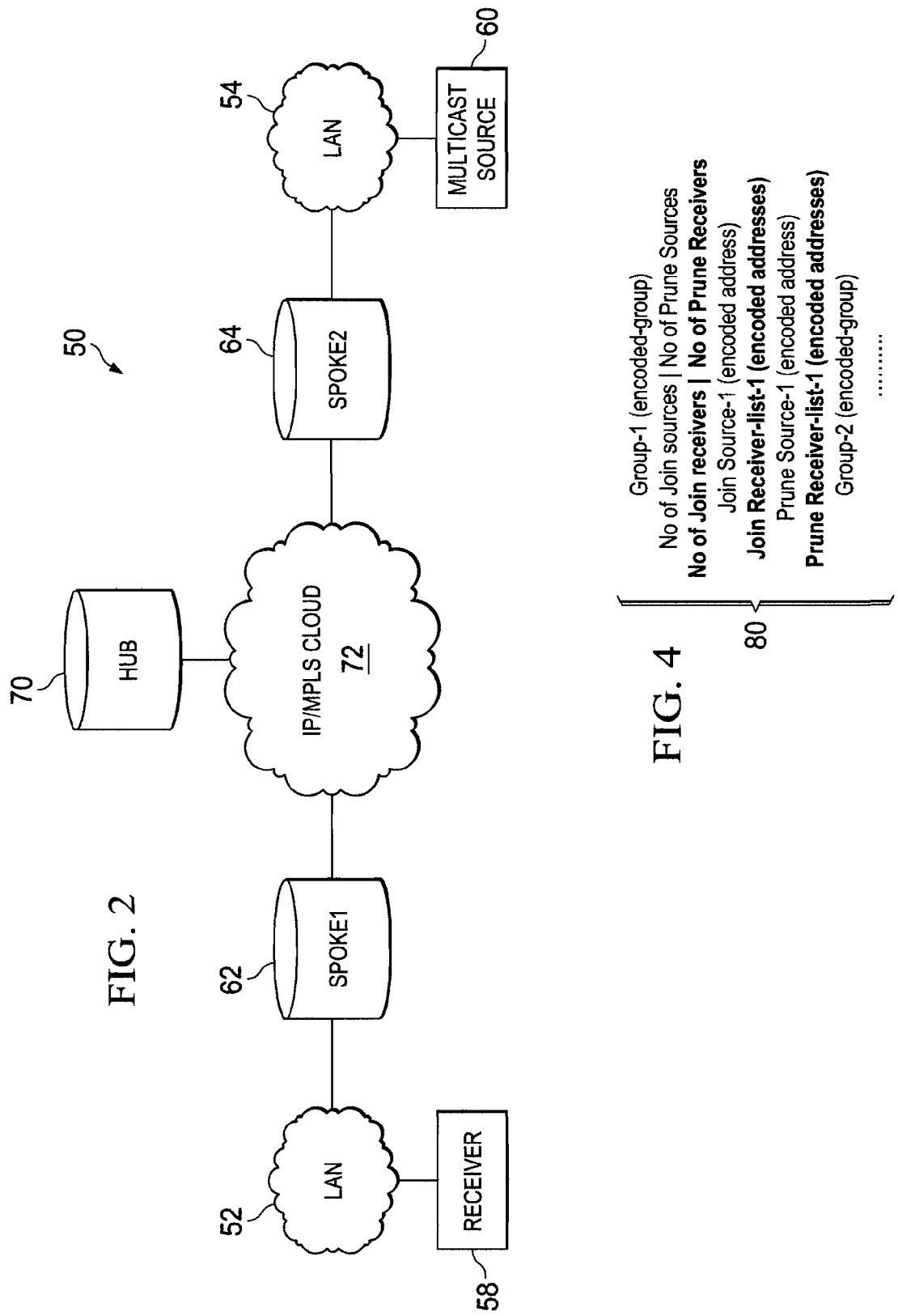

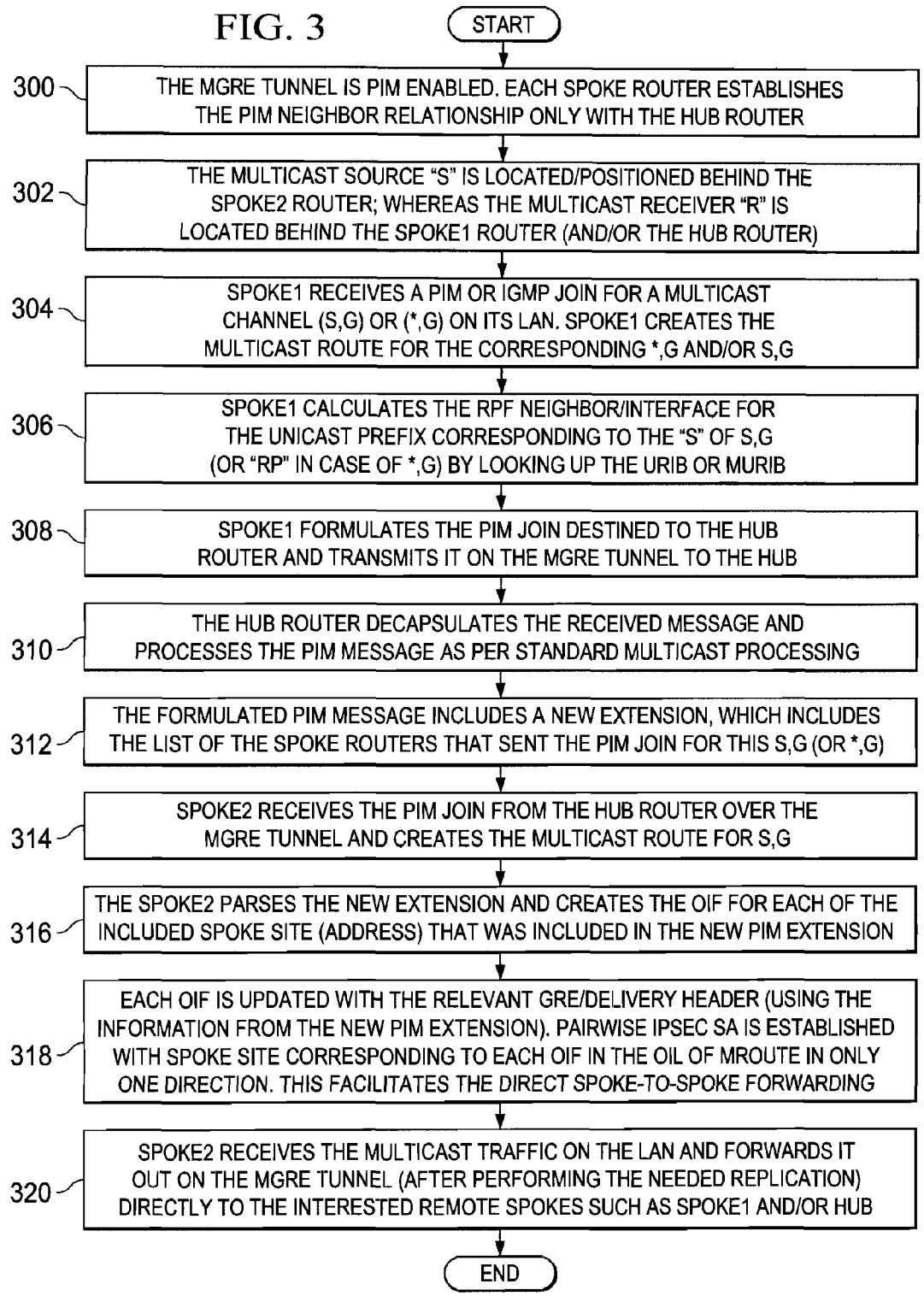

SYSTEM AND METHOD FOR MULTICASTING IN AN INTERNET PROTOCOL VIRTUAL PRIVATE NETWORK ENVIRONMENT

TECHNICAL FIELD OF THE INVENTION

This invention relates in general to the field of communications and, more particularly, to a system and a method for multicasting in an Internet Protocol virtual private network environment.

BACKGROUND OF THE INVENTION

Network operators may seek to offer multicast based network services such as broadcast video, file sharing etc. to their end users. Multicast enabled networks usually employ a multicast routing protocol such as Protocol Independent Multicast (PIM) to build the multicast tree (such that the multicast source becomes the root and the multicast receivers become the leaves of the tree) in the network.

A Virtual Private Network (VPN) is a logical network that uses shared network infrastructure, such as the Internet, to provide dedicated and optionally secure communications to members of the VPN. A VPN may maintain privacy through agreed upon security procedures and protocols. Essentially, a VPN uses custom encryption to encrypt messages communicated via the VPN. The encryption and decryption of messages rely upon keys that are securely held by participants of the VPN.

A Dynamic Multipoint virtual private network (DMVPN) is an enhancement of the virtual private network (VPN) configuration process for routers. DMVPN makes use of Internet Protocol (IP) tunneling technique such as Generic Route Encapsulation (GRE) to tunnel the VPN traffic through the shared network infrastructure. A tunnel between two spoke routers may be created on an as needed basis. This alleviates the need for the hub router to route 'unicast' data between spoke networks, as was common in a non-fully meshed frame relay topology. However, this is not applicable to 'multicast' data.

Usage of multicasting in current DMVPN framework is limited to 'hub and spoke' topology by which the multicast traffic always involves the hub. While the current framework satisfies the general needs of a given networking model, using a non-broadcast multi-access (NBMA) technique puts a significant replication load on the hub router(s), particularly when the multicast source is located in a spoke site. Accordingly, the ability to minimize this load or to optimize these communications in the context of multicasting activities presents a significant challenge to network administrators, component manufacturers, and system designers alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 2 is a simplified block diagram of the communication system, which highlights an example hub and spoke arrangement;

FIG. 3 is a simplified flowchart illustrating a series of example steps associated with a method for managing an optimal hub and spoke configuration; and FIG. 4 is a simplified diagram of a modified group list in accordance with an example implementation of the present invention.

DETAILED DESCRIPTION OF EXAMPLE EMBODIMENTS OF THE INVENTION

Overview

Figure 1:
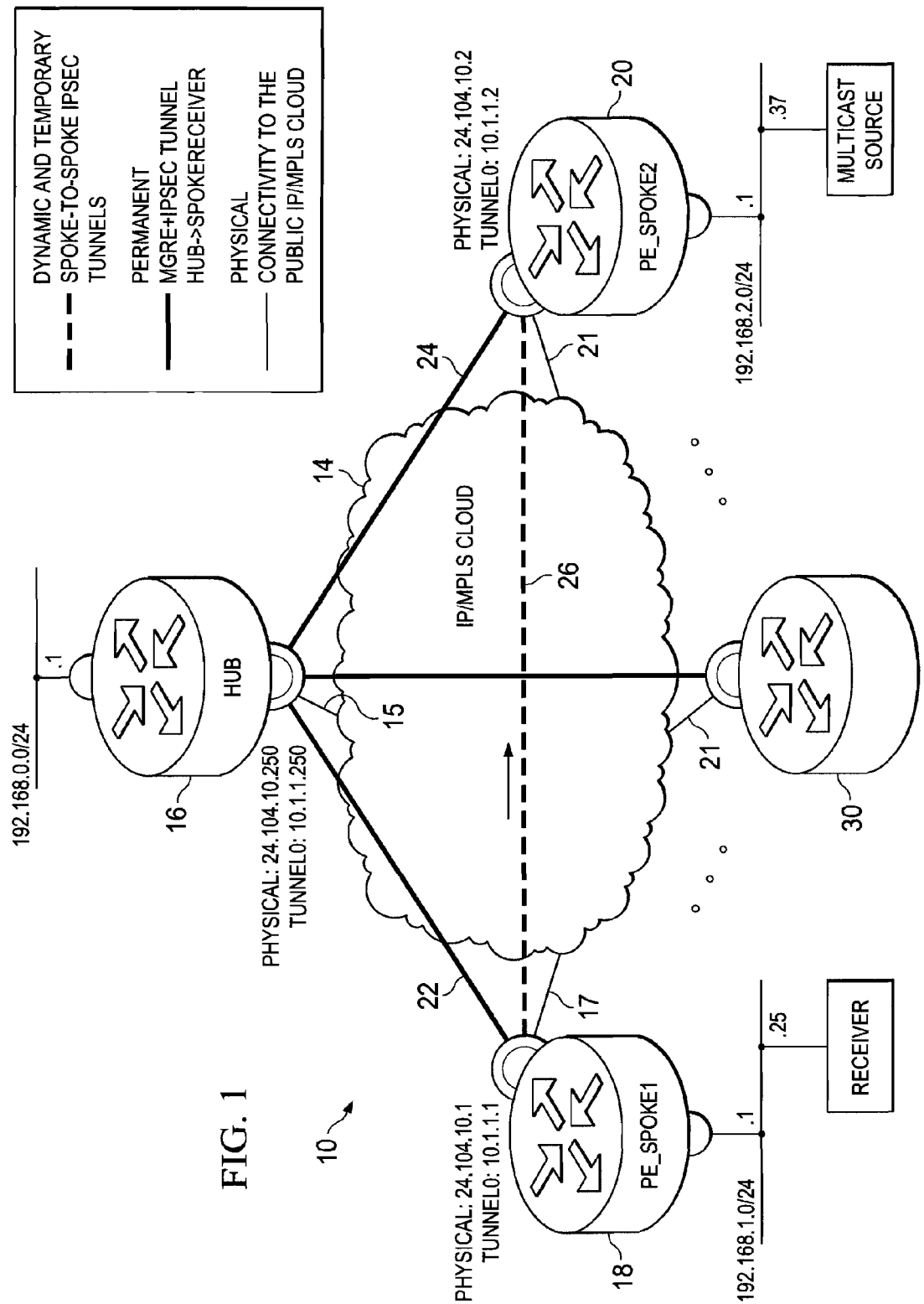
FIG. 1 is a simplified block diagram of a communications system and its topology for enabling optimal communications in a network environment in accordance with one embodiment of the present invention.

A method is provided in one example implementation and includes sending a PIM join message to the second spoke router by the hub router. The second spoke router dynamically determines each interested remote spoke router by parsing a hub-sent PIM message and accordingly constructs the multicast routing entry such that the first and second spoke routers establish multicast communication independent of a hub router. In more specific embodiments, the PIM join/prune messaging includes a list of each downstream spoke router that sent a PIM join/prune, in a new attribute. The PIM join/prune message is sent by the hub router towards a multicast source. A new receiver-list attribute is created that the hub router populates with a non-broadcast multi-access (NBMA) address for each interested spoke router.

The receiver-list attribute is used by the spoke router to formulate the outgoing interfaces for each multicast route entry. Additionally, a multicast route entry may be provided with the same incoming interface (IIF) and outgoing interface (OIF), whereby multicast traffic is received on a multi-point IP tunnel interface with Generic Routing Encapsulation (mGRE) and is forwarded on the same IP tunnel interface.

FIG. 1 illustrates a communication system 10 that includes an Internet Protocol (IP)/Multi-Protocol Label Switching (MPLS) cloud 14 that serves as the shared network infrastructure, a hub router 16, and a set of spoke routers 18, 20, and 30. Behind spoke router 18 is a receiver and behind spoke router 20 is a multicast source. The 'PE' acronym in FIG. 1 simply refers to a "Provider Edge" meaning this component may be managed or controlled by some type of service provider. In other embodiments, this ownership is different, or all the components within FIG. 1 are controlled by a single entity. Note also that, as referred to herein, the term 'router' is meant to encompass any device capable of further directing packets to a subsequent destination and, accordingly, includes items such as gateways, switches, bridges, etc.

Also provided in FIG. 1 are several connections 15, 17, 19, and 21, which provide physical connections from spoke router 18, spoke router 20, spoke router 30, and hub router 16 respectively to IP/MPLS cloud 14. Connections 22 and 24 logically connect hub router 16 to spoke router 18 and to spoke router 20 respectively. In one example implementation, connections 22 and 24 are mGRE tunnels that may be secured using a cryptography technique such as IP Security (IPSec). A direct connection 26, which represents a dynamic and temporary spoke-to-spoke GRE tunnel, is provided between spoke router 20 and spoke router 18. Alternatively, connection 26 is a simple connection without any security characteristic. This important connection is further detailed below.

The FIG. 1 implementation is merely one example of an arrangement for explaining the present invention. The typical Dynamic Multipoint virtual private network (DMVPN) framework includes a GRE piece, or multipoint GRE, if spoke-to-spoke tunnels are desired. The framework commonly includes a next-hop resolution protocol (NHRP) and some form of dynamic routing protocol such as enhanced interior gateway routing protocol (EIGRP), or open shortest path first (OSPF), for example. This framework may include an IPSec profile, which is associated to a virtual tunnel interface in IOS software. Traffic sent via the tunnel is encrypted per the policy configured (e.g., IPSec transform set).

In accordance with teachings of the present invention, communication system 10 can enable the DMVPN spoke router to dynamically determine the interested remote spokes by parsing the hub-sent enhanced protocol independent multicast (PIM) join/prune message and then constructing the related OIF of the prescribed source (S), group (G) multicast route (mroute) for each interested remote spoke. This innovation allows for spoke-to-spoke (any-to-any) multicasting in DMVPN, where the hub router does not need to be in the multicast-forwarding path. It further offers a cooperative multicasting support, where the hub and spoke routers together can share the multicast replication load.

Such an architecture further affords the ability to specify which spoke is to receive multicast traffic directly from another spoke and for what (S,G) multicast route. Furthermore, the innovation requires: a) no IGP routing protocol adjacency between spokes; b) no PIM adjacency between spokes; and c) no changes to the unicast routing table and forwarding; d) no changes to or reliance on NHRP. Additionally, there is independent control for unicast and multicast traffic for this concept. Finally, such a solution assists a DMVPN operator to readily upgrade the spoke site routers to achieve many of these benefits.

Before turning to some of the components of embodiments of the present invention, some preliminary information about typical DMVPN protocols is provided. The following foundational information may be viewed as a basis from which the present invention may be properly explained. Such information is offered earnestly for purposes of explanation only and, accordingly, should not be construed in any way to limit the broad scope of the present invention and its potential applications.

DMVPN is one of the widely deployed technologies by enterprises. DMVPN enables the enterprise VPN sites to communicate with each other in any-to-any fashion over an IP cloud that may be either a public network (such as Internet) or a private network (such as the MPLS VPN cloud). Any-to-any communication (i.e., Spoke-to-Spoke communication) is achieved by having a VPN site be aware of only the hub site through provisioning and dynamically discovering the remote VPN sites. Moreover, the network resources such as tunneling, cryptography material etc. for any-to-any communication are utilized only when they are needed.

Commonly, a DMVPN spoke is configured with one or more hub IP addresses. DMVPN hub IP addresses are typically static, such as at a corporate headquarters. DMVPN spoke IP addresses may be static, or dynamic. An example would be a DMVPN spoke router acting as a Dynamic Host Control Protocol (DHCP) client on a digital subscriber line (DSL) or cable provider's network. The spoke router is configured with the hub's IP address, allowing it to connect when online. The hub router does not need to be configured with the IP addresses of the spoke routers. This allows many-spoke VPN routers to be deployed without the need to configure additional peers on the hub(s). In the past, the configuration of the hub grew whenever a spoke VPN router was added to the DMVPN network. One of the benefits of DMVPN is that it requires the IP cloud to be capable of only unicasting, to support both unicasting and multicasting. Stated otherwise, to support multicasting in DMVPN, the DMVPN framework does not require the public or private network to be multicast capable. However, the any-to-any communication is applicable to unicast data forwarding, not multicast data forwarding.

The usage of multicasting in current DMVPN framework is limited to hub and spoke topology by which the multicast traffic goes through the hub. Spoke-to-spoke multicasting in DMVPN is desired as DMVPN operators enable their networks to carry the next-generation (Triple Play) traffic including point-to-multipoint applications such as video, etc. in which the multicast source may be located anywhere in the network While the current multicasting solution satisfies the general needs of the hub and spoke networking model, in using a non-broadcast multi-access (NBMA) technique, there is a significant multicast replication load on the hub router(s) especially when the multicast source is located in a spoke site. The current multicasting solution may also require the presence of a Rendezvous Point (RP) in the Hub site, and may not work with Source Specific Multicast (SSM).

Communication system 10 addresses these shortcomings, and others, in using a method (using PIM extensions) for spoke-to-spoke multicasting such that the multicast source can reside behind any spoke and can make use of SSM. This further facilitates any-to-any multicasting in an efficient manner and flexible manner (i.e. two hybrid models including cooperative multicasting) for optimal utilization of the DMVPN network resources.

In essence, communication system 10 lets the hub router off-load the replication load either fully or partially to the spoke router (that fronts the multicast source), while controlling which spoke site can receive the multicast data directly from the spoke site or through the hub router. The available bandwidth and processing at the spoke router makes this innovation feasible and attractive for deployment.

Turning to FIG. 2, FIG. 2 is a simplified block diagram of an example implementation 50 of the present invention. FIG. 2 includes a set of local area networks 52, 54, a set of spokes 62 and 64, a receiver 58 and a multicast source 60, a hub 70, and an IP/MPLS cloud 72. The hub and spokes can connect to each other on mGRE interfaces or any other appropriate interface, where appropriate.

The invention enables the DMVPN hub router 70 to receive one or more PIM join/prune messages from one or more spoke router 62 that fronts the receiver 58, and transmit an enhanced PIM join/prune message towards the remote spoke router 64 where the multicast source 60 is located. The PIM is enhanced such that it includes the list of each downstream spoke that sent the PIM join/prune (J/P) for a particular (S,G) in a new attribute referred to as the receiver-list attribute. This attribute is illustrated in FIG. 4, as further detailed below.

Embodiments of the invention can enable the DMVPN spoke router 64 to dynamically determine the interested remote spokes by parsing the hub-sent enhanced PIM join/prune message and then constructing the related OIF in the multicast routing entry for the prescribed (S,G) mroute.

In terms of some of the more important aspects of the present invention, the PIM enhancement is significant, where the PIM Hello message includes a new option type. In addition, the PIM join/prune includes a new receiver-list attribute that the hub populates to include the NBMA address of each interested spoke. There may also be an mroute entry with the same IIF and OIF at the hub. Communication system 10 also offers logic to allow multicast traffic to be received on an mGRE interface and be forwarded on same mGRE interface. The logic may include two internal virtual private network (VPN) routing/forwarding (VRF) tables to separate received and transmitted traffic on the same mGRE interface. Communication system 10 also offers the creation of outgoing interface (OIF) within the multicast routing entry using the PIM enhancement at the spoke. This creation is based on the receiver-list attribute information of the received PIM join/prune message, by which the spoke router updates (adds/deletes) the OIF for each multicast routing entry as per the receiver-list.

Finally, communication system 10 provides the framework to achieve cooperative multicasting, by which the DMVPN operator can selectively apply this invention such that: (a) no spoke receives traffic directly from another spoke (i.e., spoke-hub-spoke forwarding continues): (b) some spokes receive the multicast traffic directly from another spoke; and (c) all spokes receive the multicast traffic directly from another spoke. This allows the spoke router, fronting the multicast source, to dynamically determine the interested remote spoke receivers, update the multicast routing entry, and establish the GRE/IP tunnel with such receivers for multicast forwarding. The IPSec pair-wise security association (SA) may be established between the spoke source and spoke receivers. Note that the IPSec SA is needed only in one direction, i.e. from spoke2 to spoke1. Such control plane enhancement facilitates the support for both specific source multicast (SSM) and any source multicast (ASM) usage in DMVPN.

Turning to FIG. 3, FIG. 3 is a simplified flowchart illustrating an example flow associated with the present invention. The flow for the multicast control plane in DMVPN is as follows. At step 300, the mGRE tunnel is PIM enabled; hence, each spoke router can establish the PIM neighbor relationship with the hub router. At step 302, the multicast source "S" is located behind the spoke2 router, whereas the multicast receiver "R" is located behind the spoke1 router (and/or the hub router). At step 304, spoke1 receives a PIM or IGMP join for a multicast channel (S, G) or (*, G) on its LAN. Spoke1 creates the multicast route for the corresponding *, G and/or S, G. At step 306, spoke1 calculates the RPF neighbor/interface for the unicast prefix corresponding to the "S" of S, G (or "RP" in case of *, G) by looking up either the unicast routing table (uRIB) or the Multicast Unicast Routing table (MuRIB). The result is the RPF neighbor being the hub router, which is also the PIM neighbor.

At step 308, spoke1 formulates the PIM join destined to the hub router and transmits it on the mGRE tunnel to the hub (IPSec associations are likely to exist, since the hub is a routing neighbor as well as the NHRP NextHop Server). At step 310, the hub router decapsulates the received message and processes the PIM message as per standard multicast processing (i.e., create an mroute etc.), and forwards the PIM message to the remote spoke2 router, which is the RPF neighbor, as per the uRIB/MuRIB for the created mroute.

The formulated PIM message includes a new extension, which includes the list of the spoke routers that sent the PIM join for this S, G (or *, G). This is illustrated by step 312. The hub router may limit the number of spoke sites included in this extension via the provisioning component, etc. The extension would include the public and private IP address pairs related to the spoke site. This helps to avoid NHRP resolution, if NHRP is present at the spoke2 router. The spoke sites that are included in this new PIM extension are intended to be directly served by the remote spoke router. Hence, such spoke sites may not be present in the outgoing interface list (OIL) of the mroute entry at the hub (or if present, then flagged accordingly to not use forwarding).

At step 314, spoke2 receives the PIM join from the hub router over the mGRE tunnel and creates the multicast route for S, G. More importantly, at step 316, the spoke2 parses the new extension and creates the OIF for each of the included spoke sites (addresses) that were included in the new PIM extension. At step 318, each OIF is updated with the relevant GRE/delivery header (using the information from the new PIM extension). If IPSec cryptography is enabled on the interface, then Pair-wise IPSec SA is established with spoke sites corresponding to each OIF in the OIL of mroute in only one direction. This facilitates the direct spoke-to-spoke forwarding. At step 320, spoke2 receives the multicast traffic on the LAN and forwards it out on the mGRE tunnel (after performing the needed replication) directly to the interested remote spokes, such as spoke1 and/or the hub.

Turning to FIG. 4, FIG. 4 is a simplified group list 80 for communication system 10. Before turning to the details of that list, it should be acknowledged that a majority of the enhancements of communication system 10 are in the control plane: specifically, the multicast control plane as discussed herein. Note that the DMVPN spoke/hub router continues to calculate the RPF neighbor/interface for the unicast prefix associated with "S" or "RP" (for (S,G) in SSM or *,G in ASM) by looking up the unicast RIB or MuRIB.

In terms of the PIM enhancement and new extensions, the two new extensions can be defined as: 1) a new option type within Hello message to convey the ability to include the receiver list attribute in the PIM J/P message; and 2) a new receiver-list attribute within the Group-list of PIM J/P message. This attribute encodes the list of interested spoke routers' IP addresses. The receiver-list is formulated using the incoming PIM joins from the interested spoke sites. The encoding includes at least the NBMA address of the spoke router. This helps to avoid any next-hop resolution for the spoke routers.

The modified group list 80 in PIM J/P may look like that which is depicted by FIG. 4. When the spoke site, which was included in the 'JOIN receiver-list' by the hub, later sends a Prune message to the hub, then the hub router includes the spoke site address in the 'Prune receiver-list' instead and conveys to the remote spoke router to signal it to remove the related OIF from the mroute. The same applies when the hub site deliberately intends to exclude at least one that was previously included in the receiver-list by the hub router.

In regards to the RPF and multicast routing table at the hub, there is intelligence that is added to the multicast routing such that the receiving spoke sites (corresponding to outgoing interfaces (OIFs)) are differentiated from the source spoke site (corresponding to the Incoming Interface (IIF)) in the mroute entry, even though they are all reachable via the same mGRE interface. This allows the hub router to receive the PIM joins from the receivers (spoke sites), and to transmit the resulting PIM join upstream towards the source (another spoke site) without violating conventional multicasting rules.

For the OIF creation using PIM extensions at the spoke, the intelligence is added to the multicast routing such that the OIF is added to the relevant mroute for each entry in the list included within the new PIM extension. This allows the spoke router, fronting the multicast source, to dynamically determine the interested remote spoke receivers. Once the OIF is created, the corresponding GRE header is built and IPSec pair-wise SA can be established.

For the forwarding plane, the multicast-forwarding plane remains unchanged except that the (spoke) router may update the mroute's OIL with the OIFs, as per the information in the "receiver-list" attribute of the received PIM message. In the case of a PIM Join, the OIF is added, and in the case of PIM Prune, the corresponding OIF is removed. In terms of a hybrid model (e.g., spoke-hub-spoke and spoke-spoke forwarding), there could be two models. One model allows the hub to specify which spoke sites get to use (100%) the spoke-tospoke multicasting protocol. The other model allows hub to share the multicasting (e.g. replication responsibility) with each of the specified spokes sites.

For hybrid model #1—, a DMVPN operator may want to limit the deployment of this invention to certain spoke sites that have sufficient WAN bandwidth available. This means that certain spoke sites (with sufficient capacity) may forward multicast traffic spoke-to-spoke to every interested spoke, whereas certain spoke sites (with less-than-sufficient processing capacity) may forward the multicast traffic spoke-hub-spoke. While there may be a number of ways to control this, a model by which the DMVPN operator could control this via the hub router(s) is the most optimal, as well as preferable (due to better manageability). In this approach, the hub router, based on the local policy, determines whether the new extension (containing the list of interested spoke sites) should be added to the outgoing PIM message or not.

In terms of hybrid model #2—, a DMVPN operator may want to limit the deployment of this invention to a spoke site such that both the spoke site router and the hub router together serve the receivers. Some receivers are served by the spoke directly (spoke-to-spoke), whereas the remaining receivers are served by the hub (spoke-hub-spoke), where the hub becomes the proverbial 'middleman.' This helps to distribute the multicast replication load (i.e., fan-out load) on the spoke router fronting the multicast source and the hub router. This can be accomplished by having the hub router utilize certain logic by which it includes only a limited number of spoke sites in the new extensions of the PIM message. The included spoke sites receive the multicast content directly from the spoke site fronting the multicast source. The remaining spoke sites end up receiving the multicast content through the hub site.

This logic may also include consideration for the replication capacity (including available WAN bandwidth) of the spoke site fronting the multicast source. The replication capacity is considered to be related to the number of OIF for an mroute. This model includes consideration for the bandwidth and router resource bottleneck when using multicast applications in DMVPN networks.

In terms of highlighting some (not necessarily all) of the advantages of the architecture of communication system 10 and the previously discussed flows, such protocols do not require the spoke router (fronting the multicast source) to request any multicast receiver information. The architecture does not require the spoke router (fronting the multicast receivers) to do anything extraordinary. Furthermore, it does not require the IPSec SAs between two spokes in both directions because multicast traffic flows in one direction. Furthermore, it requires changes at the spoke router (fronting the multicast source), as well as the hub router. Conceptually, the protocol helps the hub router keep control over whether to pass this list to each spoke for each S, G, etc. This helps with the incremental deployment of example embodiments of the invention.

Software and/or hardware (inclusive of memories and processors that can execute any software application) may reside in spoke router(s) and/or the hub in order to achieve the teachings of the present invention. The software can offer the control plane enhancements (outlined herein) and could be stored in any type of memory and subsequently executed by any type of processor to carry out the functionalities explained in this Specification. In one instance, only the spoke router (e.g., having the source behind it) includes this software, potentially along with the hub router in order to achieve the operational advantages as outlined here. In other embodiments, all spoke routers include such upgrades, along with the hub router. In still other embodiments, only the hub router includes the necessary enhancements to achieve the teachings of the present invention. Any of these components may be consolidated, or any one of these can be eliminated, or added to the system elsewhere, while remaining within the broad scope of the present invention. Due to their flexibility, these items may alternatively be equipped with (or include) any suitable algorithm, hardware, component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of these outlined configurations in the context of communication system 10 and, accordingly, they should be construed as such.

Note that the examples of the preceding FIGURES have been offered for purposes of teaching only. Accordingly, some of these discussed steps may be changed, deleted, or replaced with other steps where appropriate. Such modifications may be based on particular communication needs or specific communication architectures and configurations and are within the teachings of the present invention.

As explained above, the lack of spoke-spoke multicasting support has been a known limitation in DMVPN. This invention aids the DMVPN adoption by customers (such as Movie Studios, Financial Enterprises, Media Enterprises etc.) needing to distribute Multicast traffic (such as Video or Data) spoke-to-spoke. There are two approaches to tackle the multiple hubs scenario. One approach is to let each hub append the attached receiver information in the PIM message that ultimately is delivered to the remote spoke (sender). The other approach is to enable each hub to individually and directly convey the PIM message (and receiver info) to the remote spoke (sender), since NHRP, at the hub, would have resolved the next-hop of remote spoke via the other hubs. Both approaches are outlined and encompassed in this Specification.

Although the present invention has been described in detail with reference to particular embodiments, it should be understood that various other changes, substitutions, and alterations may be made hereto without departing from the spirit and scope of the present invention. For example, although the present invention has been described as operating in IPSec environments or VPN arrangements, the present invention may be used in any networking environment that could include such technology. Virtually any configuration that could offer a hub and spoke connection would enjoy the benefits of the present invention.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A hub router, comprising:
a processor; and
a memory;
wherein the hub router that receives protocol independent multicast (PIM) messages from a first spoke router, whereby the hub router sends one PIM join message to a second spoke router, wherein the second spoke router dynamically determines an interested remote spoke router by parsing a hub-sent PIM message and by constructing a related outgoing interface in a multicast routing entry such that the first and second spoke routers establish a communication independent of the hub router, wherein PIM messaging includes a list of downstream spoke routers that sent a PIM message in a new attribute, and wherein a new receiver-list attribute is created that the hub router populates to include a non-broadcast multi-access (NBMA) Internet Protocol (IP) address for each interested spoke router.

2. The hub router of claim 1, wherein a multicast route entry is provided with a same incoming interface (IIF) and outgoing interface (OIF), whereby multicast traffic is received on a multi-point IP tunnel with Generic Routing Encapsulation (GRE) and is forwarded on a same multi-point IP tunnel.

3. The hub router of claim 2, wherein the hub router includes two internal virtual private network (VPN) routing/forwarding (VRF) tables to separate received and transmitted traffic.

4. The hub router of claim 1, wherein the multicast route (mroute) OIF creation at the spoke router is based on a receiver-list attribute information of a received PIM message, whereby the first spoke router updates an outgoing interface for each entry in the receiver-list.

5. The hub router of claim 1, wherein no spoke router receives traffic directly from another spoke router or some spoke routers receive multicast traffic directly from another spoke router.

6. The hub router of claim 1, wherein all spoke routers receive multicast traffic directly from another spoke router.

7. The hub router of claim 1, wherein a selected spoke router, fronting a multicast source, dynamically determines an interested remote spoke router receiver, whereby once an outgoing interface is created, a corresponding IP tunnel with Generic Routing Encapsulation (GRE) is constructed.

8. The hub router of claim 1, wherein the hub and spoke routers support specific source multicast (SSM) and any source multicast (ASM) usage.

9. The hub router of claim 1, wherein the hub router appends an attached receiver's information in a selected PIM message that is delivered to a remote spoke router, or the hub router directly conveys the selected PIM message to the remote spoke router.

10. A method, comprising:
receiving protocol independent multicast (PIM) messages from a first spoke router, whereby a hub router sends one PIM join message to a second spoke router, wherein the second spoke router dynamically determines an interested remote spoke router by parsing a hub-sent PIM message and by constructing a related outgoing interface in a multicast routing entry such that the first and second spoke routers establish a communication independent of the hub router, wherein PIM messaging includes a list of a plurality of downstream spoke routers that sent a PIM message in a new attribute, and wherein a new receiver-list attribute is created that the hub router populates to include a non-broadcast multi-access (NBMA) Internet Protocol (IP) address for each interested spoke router.

11. The method of claim 10, wherein a multicast route entry is provided with the same incoming interface (IIF) and outgoing interface (OIF), whereby multicast traffic is received on a multi-point IP tunnel with Generic Routing Encapsulation (GRE) and is forwarded on a same multi-point IP tunnel.

12. Logic encoded in one or more tangible non-transitory media for execution and when executed by a processor operable to:
receive protocol independent multicast (PIM) messages from a first spoke router, whereby a hub router sends one PIM join message to a second spoke router, wherein the second spoke router dynamically determines an interested remote spoke router by parsing a hub-sent PIM message and by constructing a related outgoing interface in a multicast routing entry such that the first and second spoke routers establish a communication independent of the hub router, wherein PIM messaging includes a list of each downstream spoke router that sent a PIM message in a new attribute, and wherein a new receiver-list attribute is created that the hub router populates to include a non-broadcast multi-access (NBMA) Internet Protocol (IP) address for each interested spoke router.

13. The logic of claim 12, wherein the multicast route (mroute) OIF creation at the spoke router is based on a receiver-list attribute information of a received PIM message, whereby the first spoke router updates an outgoing interface for each entry in the receiver-list.

14. The logic of claim 12, wherein a hello message is provided with an option type that conveys an ability to include a receiver list attribute in a PIM message.

15. The logic of claim 12, wherein a selected spoke router, fronting a multicast source, dynamically determines an interested remote spoke router receiver, whereby once an outgoing interface is created, a corresponding IP tunnel with Generic Routing Encapsulation (GRE) is constructed.

16. A system, comprising:
means for receiving protocol independent multicast (PIM) messages from a first spoke router, whereby a hub router sends one PIM join message to a second spoke router, wherein the second spoke router dynamically determines an interested remote spoke router by parsing a hub-sent PIM message and by constructing a related outgoing interface in a multicast routing entry such that the first and second spoke routers establish a communication independent of the hub router; and
means for including, within PIM messaging, a list of each downstream spoke router that sent a PIM message in a new attribute, wherein a hello message is provided with an option type that conveys an ability to include a receiver list attribute in a PIM message, and wherein a new receiver-list attribute is created that the hub router populates to include a non-broadcast multi-access (NBMA) Internet Protocol (IP) address for each interested spoke router.

* * * * *